June 2, 1959     G. F. DIODATI ET AL     2,889,027
APPARATUS FOR EMBEDDING ELECTRIC UNITS
Filed March 18, 1954     3 Sheets-Sheet 1

INVENTORS
G. F. DIODATI
L. A. McCARTHY
J. C. SOUTER
BY
ATTORNEY

June 2, 1959  G. F. DIODATI ET AL  2,889,027
APPARATUS FOR EMBEDDING ELECTRIC UNITS
Filed March 18, 1954  3 Sheets-Sheet 2
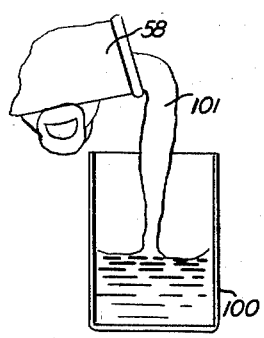
FIG 2
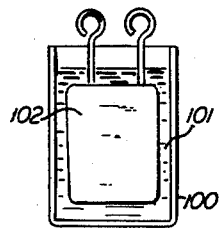
FIG 3
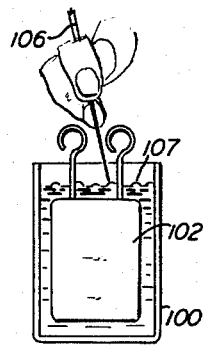
FIG 4
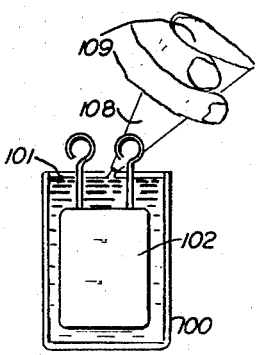
FIG 5
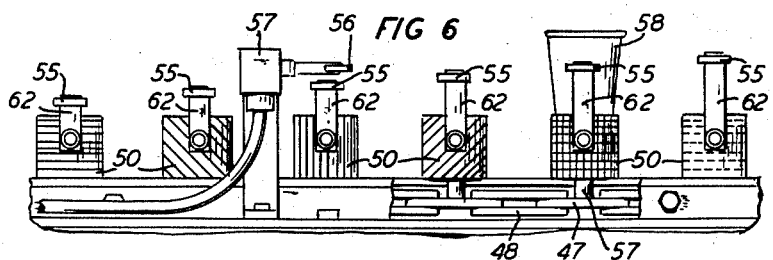
FIG 6
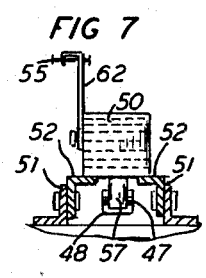
FIG 7
FIG 8
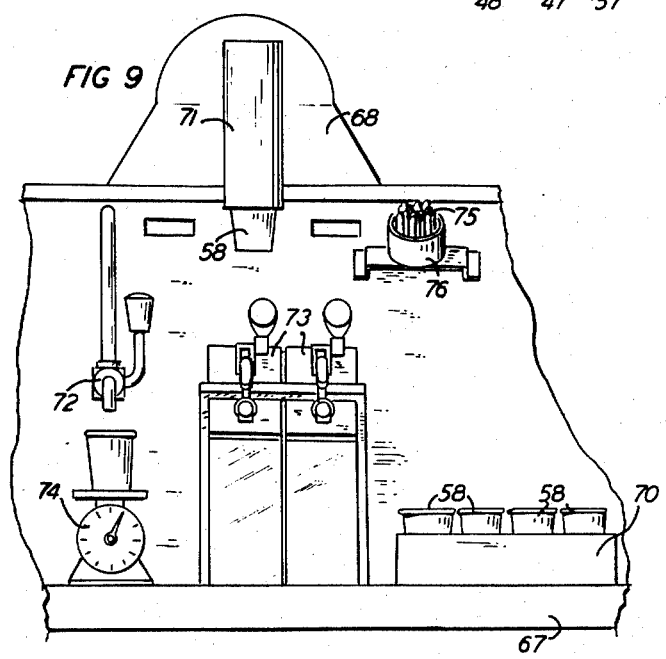
FIG 9
INVENTORS
G. F. DIODATI
L. A. McCARTHY
J. C. SOUTER
By
ATTORNEY

United States Patent Office 2,889,027
Patented June 2, 1959

2,889,027
APPARATUS FOR EMBEDDING ELECTRIC UNITS

Giacomo F. Diodati, Newton Junction, N.H., and Lawrence A. McCarthy, Haverhill, and John C. Souter, West Newbury, Mass, assignors to Western Electric Company, Incorporated, New York, N.Y., a corporation of New York Application March 18, 1954, Serial No. 417,202

4 Claims. (Cl. 198—19)

This invention relates to apparatus for potting electric units and more particularly to methods of and apparatus for embedding electric units in a plastic resin.

Various types of electric units, in the past, have been provided with preformed covers for supporting terminals, and in certain instances mounting screws, for the units. This created a difficult problem in pouring the conventional potting compound about the electric units in the conventional cans. Furthermore, the pouring of potting compounds in the cans over and around the electric units tended to trap air forming undesirable pockets about the units.

It has been found that an epoxy resin would produce a highly desirable structure and, by the use of which, more desirable results could be attained. For example, the covers formerly used for the cans could be eliminated making it possible to produce an air free solid mass about each electric unit. However, the pot or pour life of the epoxy resin is very short, hence limiting the time, after the admixture of the base compound and hardener in proper proportions, for pouring of the admixture into the cans and the embedment of the electric units therein. Furthermore, the mixing of the hardener in the base compound would tend to produce two undesirable effects particularly to the skin and lungs of the person performing the mix, unless proper precautions are taken. Contact of the material with the hand may produce dermatitis and the amines escaping from the hardener during the mixing operation may have a bad effect on the lungs. However, with the proper precautions, such ill effects may be avoided making it feasible to take advantage of the epoxy resin for the embedment of electric units therein.

The object of the invention is apparatus for embedding electric units in a plastic resin.

With this and other objects in view, the invention comprises an apparatus by the aid of which a method may be practiced for embedding electric units having terminals in a plastic resin having a short pour life, the method including admixing a hardener in a base compound to produce a quantity of plastic resin for a predetermined number of units, pouring the plastic resin into open end containers to levels short of said open ends, positioning the units in the resin leaving the terminals exposed and allowing the resin to harden about the units.

More specifically, the apparatus includes tables positioned adjacent a series of conveyors and remote from a mixing compartment in which there is an exhaust system to remove all dangerous fumes resulting from mixing the hardener with the base compound and where an operator with the proper gloves may fill orders for the resin. A conveyor having groups of cups with certain color codes for the respective tables and through the assistance of a signaling system for both the tables and the mixing chamber, it is possible for the orders to be filled and transported quickly to the proper table.

In carrying out the steps by the aid of the apparatus, the orders of plastic resin when received at certain tables are divided into a given number of containers to increase the pot life of the resin, allowing time for operators at other tables to embed the electric units therein. Rapidly moving conveyors between the pouring station and the embedding station assure completion of the initial steps prior to hardening of the resin. However, slow moving conveyors for the embedded units allow time for an operator to puncture any bubbles forming in the resin and for the resin to harden prior to the final pouring operation. The final pouring operation produces a finished surface eliminating the need of the former covers for the containers and also filling any crack or opening resulting from shrinkage during hardening of the initial resin about the electric unit.

Other objects and advantages will be apparent from the following detailed description when considered in conjunction with the accompanying drawings, wherein:

Fig. 2 illustrates the method step of pouring the initial quantity of resin in a container;

Fig. 3 illustrates the result of the step of lowering the electric unit into the resin;

Fig. 4 illustrates the step of puncturing bubbles formed by the escapement of air;

Fig. 5 illustrates the finishing pour of resin in the container;

Fig. 6 is a fragmentary side elevational view of the cup conveyor illustrating one group of color coded cups and their switch actuating elements;

Fig. 7 is a vertical sectional view of the structure shown in Fig. 6;

Fig. 8 is a fragmentary isometric view illustrating the switch controlling cam of one of the coded cups;

Fig. 9 is a fragmentary front elevational view of the mixing compartment, and

Figure 1:
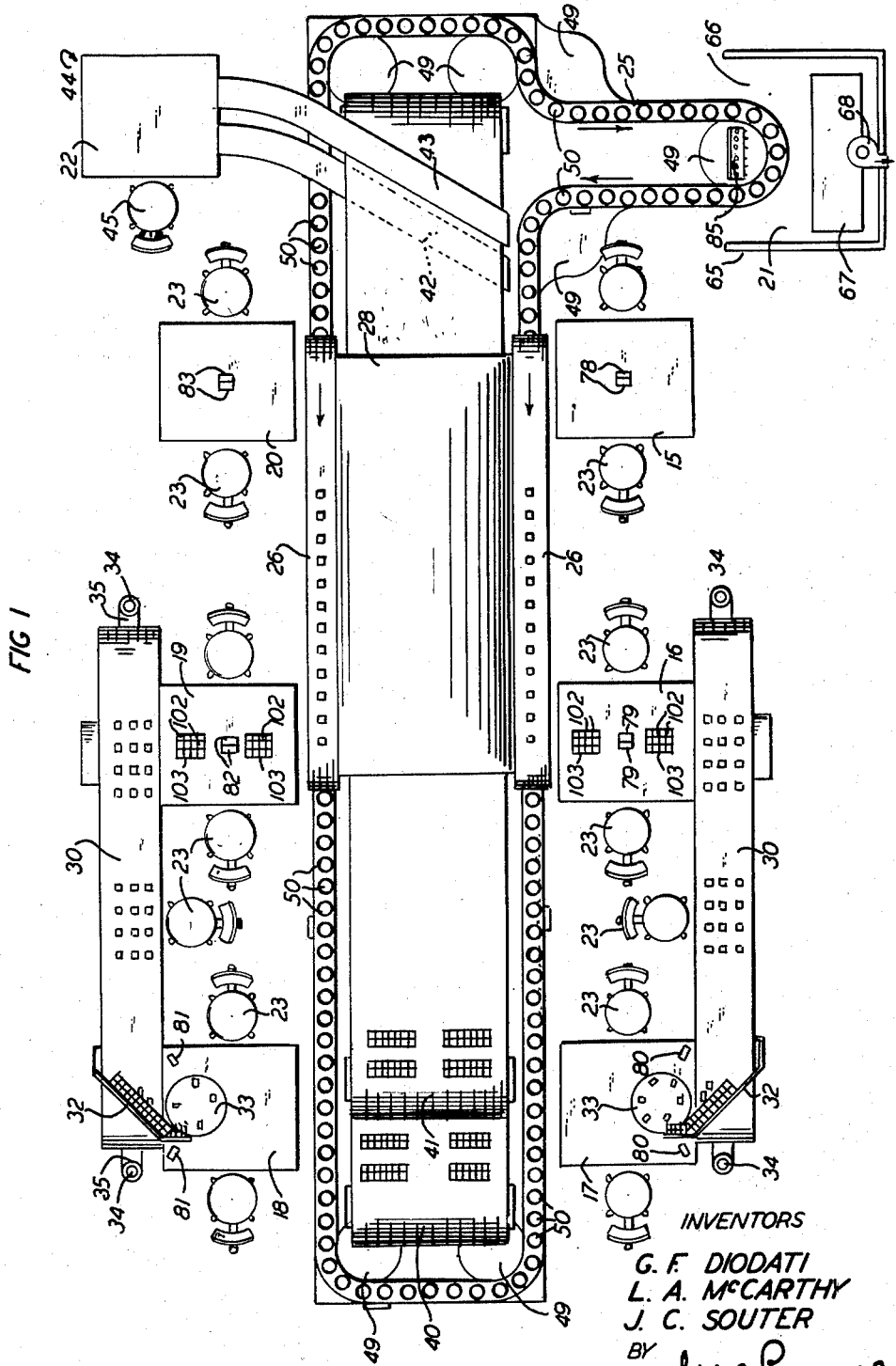
Fig. 1 is a top plan view of the apparatus.

Referring now to the drawings, attention is first directed to Fig. 1 which illustrates loading stations, 15, 16, 17, 18, 19 and 20 together with a mixing station 21 and a finishing station 22. Chairs 23 indicate the positions of the operators at the loading and finishing stations. An endless conveyor 25, which may be identified as a cup conveyor, travels in an endless path between mixing station 21 and all of the loading stations 15 to 20 inclusive.

Endless belt type conveyors 26 disposed above the conveyor 25 adjacent the loading stations 15 and 16 on one side and loading stations 19 and 20 on the other side of an oven 28 have their top surfaces travelling in the direction of the arrows at relatively fast speeds, such as 12 to 24 feet per minute, to transport containers partially filled with resin at the first stations 15 and 20 to the second stations 16 and 19. Slow moving endless belt type conveyors 30 disposed at the outside of the stations 16—17 and 18—19 travel at 2 to 6 inches per minute, taking approximately 45 minutes to transport the containers or cans, having the initial pour of resin and the electric units embedded therein at the second stations 16 and 19, to the stations 17 and 18. Diagonal elements 32 fixed to the frames of the conveyors 30 and positioned over the upper surface of the endless belts thereof cause the containers to move off the belts of the conveyors and onto rotatable turntables 33 mounted on or above their respective tables 17 and 18. It will be noted that the conveyors 30 close the area between stations 16 and 17 on one side and stations 18 and 19 on the other side. For this reason, the conveyors 30 are constructed as complete units supporting their motors and driving mechanisms in frame-like structures connected at the ends to air cylinders 34. The air cylinders 34 have piston rods 35 fixed at their upper and lower ends to suitable means (not shown) so that by the aid of valves in air lines connected to the air cylinders, the conveyors 30 may be raised to suitable heights to allow the operators to enter or leave the areas between stations 16—17 and 18—19.

The oven 28, closed completely, except at both ends has endless belts or conveyors 40 and 41 travelling therethrough. Suitable heating elements (not shown) are disposed in the oven to heat the embedded electric units sufficiently to cure the plastic resin in which they are embedded. The conveyors 40 and 41 are wide enough to receive all of the articles from stations 17 and 18 and move them at speeds from 1 to 3 inches per minute toward and through the oven 28. After leaving the oven, suitable receiving guides 42 and 43, positioned adjacent the upper surfaces of the conveyors 40 and 41 respectively, cause the articles to move from these conveyors onto a table 44 where an operator seated at 45 may straighten the terminals of the electric units and make any desired tests thereon.

The conveyor 25 is of the chain type shown in detail in Figs. 6 and 7 including, for example, single links 47 and double links 48 travelling around a plurality of sprockets 49, one of which is driven to cause continuous movement of the conveyor in a direction of the arrows. Cuplike holders 50 are connected at 51 to the links 47 of the chain and caused to travel on or above the upper surfaces of angle members 52 which form parts of the stationary structure of the conveyor 25. In the present embodiment of invention, the holders 50 are divided into successive groups with color codes (as illustrated in Fig. 6) so that each cup in each group may represent their respective stations 15 to 20 inclusive. The cups in each group have switch actuating cams 55 positioned at different levels (as shown in Fig. 6) corresponding to the levels of rollers 56 of their respective micro-switches 57 so that only the cam 55 of the coded cup for any micro-switch 57 will operate that switch and then, only when the holder 50 is provided with a receptacle 58 of resin.

The cams 55 are identical in structure and a description of one will apply to all of the cams. Attention is now directed to Fig. 8 which illustrates a cam 55 which, in the present embodiment of the invention, is a strip of metal, arcuate in general contour, fixed to the adjacent ends of parallel rods 60 slidable freely in apertures (not shown) in a U-shaped portion 61 of a bracket 62 and having the inner ends of the rods fixed to a similar arcuate shaped strip or element 63 positioned to be engaged by one of the receptacles 58. The brackets 62 are identical in structure differing only in their lengths as illustrated in Fig. 6 so that, when secured to their respective holders 50, the cams 55 and associated rods 60 and elements 63 will be disposed in their predetermined planes, corresponding to the planes of their micro-switches 57. From this structure, it will be apparent that the free movement of the rods in the apertures of their brackets 62 will allow the cams 55 to move into engagement with the rollers 56 of their respective switches 57 without causing actuation thereof in that the rollers 56 will move the rods over their holders 50 if no receptacle of resin is disposed in its respective holder to engage the element 63 and hold the cam 55 outwardly and against inward movement.

The mixing station 21 is completely enclosed by a hood 65 except at the front 66, this station being provided with a table 67 over which there is an exhausting means 68 capable of removing any dangerous vapors resulting from the admixture of the base compound and hardener to produce the resin. Supplies of paper cups or receptacles 58 may be disposed in a group on a tray 70 or in stacked formation in a holder 71 adjacent a dispenser 72 for the base compound and dispensers 73 for the hardener. A suitable scale 74 is provided for movement relative to the dispensers 72 and 73 on the table 67 so that the proper proportions of the base compound and hardener may be measured or weighed accurately. A supply of wooden mixing paddles 75 disposed in a holder 73 may be used singly for the mixing operations.

Figure 10:
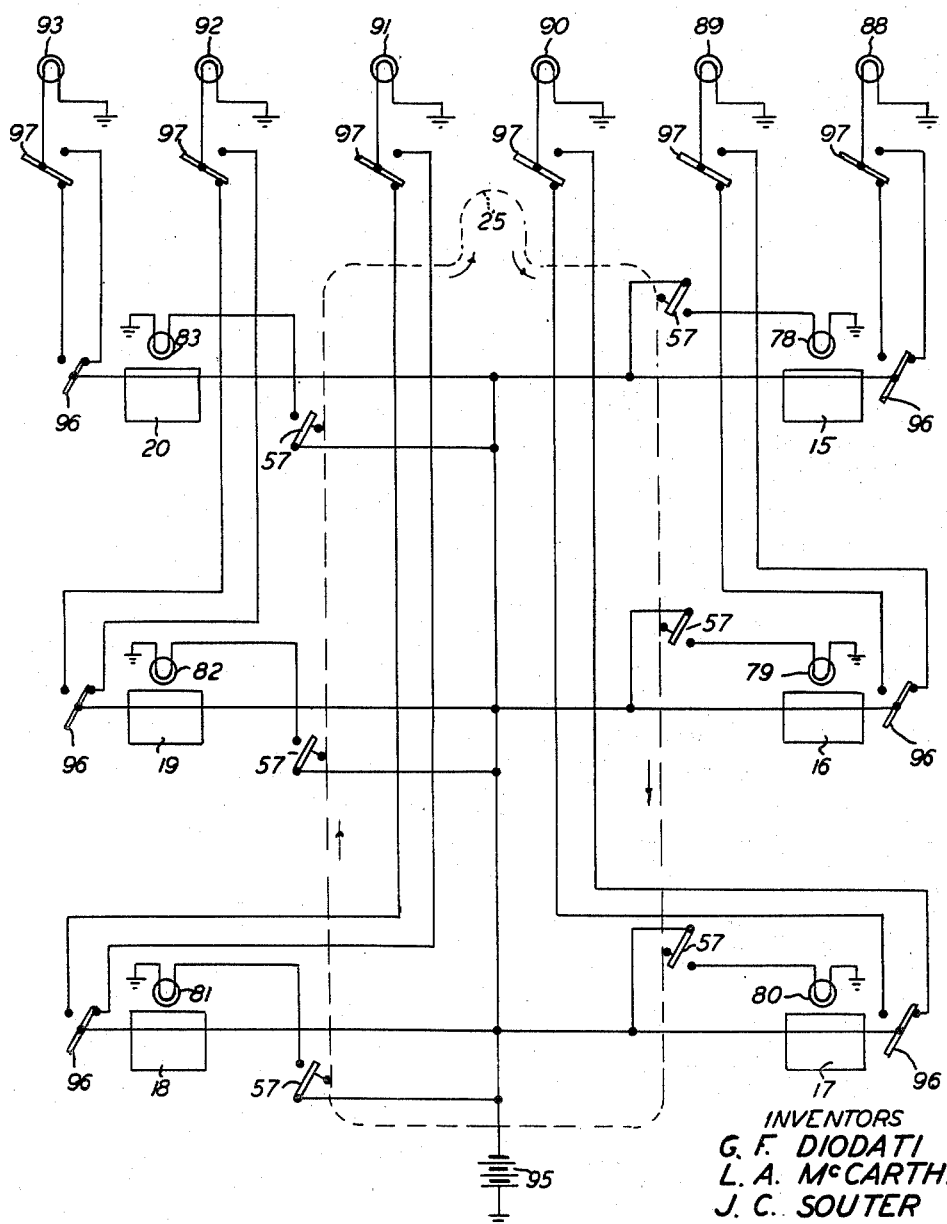
Fig. 10 is a simple wiring diagram of the signaling system of the apparatus.

Before referring to the wiring diagram in Fig. 10, attention is directed to the box-like members 78, 79, 80, 81, 82 and 83 representing lamps at stations 15 to 20 inclusive. Furthermore, a bank of lamps 85 disposed adjacent the peninsula of the conveyor 25 extending into the mixing station 21 with 6 lamps corresponding respectively to the 6 loading stations 15 to 20 inclusive, and bearing numbers 88, 89, 90, 91, 92 and 93 in Fig. 10 corresponding to the respective stations 15 to 20 inclusive. Although the box-like structures 78 to 83 inclusive at the stations 15 to 20 inclusive are shown in pairs, the lamps in each pair are energized simultaneously and for this reason, only one lamp at each station is shown in Fig. 10.

Referring now to Fig. 10, it will be noted that this is a simple circuit supplied with electrical energy from a source such as grounded battery 95 so that when any of the cam operated switches 57 adjacent the conveyor 25 are actuated, this actuation takes place just prior to the cup of resin reaching its respective station, giving the operator at that station time to reach ground and remove the cup of resin from the conveyor. The other circuits for the lamps 88 to 93 inclusive are shown as three-way circuits under the control of switches 96 suitably positioned so that either operator at any of the loading stations may operate their respective switch to complete a circuit to their respective lamp at the filling station 21. The illumination of any of these lamps will indicate to the operator that a supply of resin is desired at a given station and, if the operators at those respective stations require known amounts of resin, these amounts may be mixed and placed in the respective holder 50 of the conveyor 25 and delivered. Switches 97 are positioned to be actuated by the operator in the filling station when each order is completed and delivered to the conveyor 25 so as to open the circuit to that particular lamp thus cancelling the visual request for resin and indicating that that order has been filled.

Attention is now directed to Figs. 2 to 5 inclusive which illustrate the order of certain method steps practiced by the aid of the apparatus. In the present embodiment of the invention, the operators at the first stations 15 and 20 have supplies of empty cans 100 and by positioning a desired number of them in alignment, preferably in abutting engagement side by side, they may be filled to a known level with the resin 101 from its cup 58 so that when the electric units 102 are embedded in the cans at the second stations 16 and 19, the level of the resin 101 will be short of the upper end of the can, as shown in Fig. 3. Trays 103 of electric units 102 are supplied to the operators at the second stations 16 and 19. Fig. 4 illustrates a step of the method carried out by operators located at the central positions between the second stations 16—19 and the third stations 17—18, facing the conveyors 30 and by the aid of a suitable needle-like tool 106, puncturing the bubbles 107 which appear as a result of the embedment of the electric unit 102 in the resin. Fig. 5 illustrates the use of a paper cone 108 filled with a supply of resin 101 and closed at the upper end 109 while having an open lower end through which the finishing supply of resin 101 may be forced.

Considering now the carrying out of the method steps by the aid of the apparatus, it will be apparent, with the operators in their respective positions, that those at the first stations 15—20 supplied with empty cans 100 and those at the second stations 16—19 supplied with the electric units 102, the conveyors may be set in motion and the heating units in the oven energized. The first action taken by the operators at the first loading stations 15 and 20 are to operate their switches 96 to energize their respective lamps 88 and 93 to order supplies of resin from the mixing station 21. These supplies are mixed and placed in their paper cups in a respective color coded holder 50 of the conveyor 25 where they will start on their way to their respective stations 15 and 20. Due to the fact that the station 20 is farther from the mixing station than station 15, the first order will continue on to station 20 while the second order filled will be directed to station 15. While waiting for the resin, the operators at these stations may line up empty cans 100 sufficient in number for the first supply of resin. As an illustration, 12 cans have been selected and Fig. 1 illustrates 12 cans on the conveyors 26 which have been filled with the resin and are on their way to the second stations 16 and 19. The operators at the second stations remove the partially filled cans from their conveyors 26 and embed the electric units 102 therein (as illustrated in Fig. 3). These embedded units are then placed on the conveyors 30 where they travel slowly to the stations 17 and 18 allowing the resin to harden about each electric unit and for the air moved into the resin by the embedment of the electric units to approach the surface of the resin and to escape or to be assisted in the escapement thereof (as illustrated in Fig. 4). Any cracks or apertures formed in the resin during this interval will be filled during the final pouring or finishing operation (as illustrated in Fig. 5) at stations 17 and 18. The articles when completed at stations 17 and 18 are placed on the slow moving conveyors 40 and 41 where they will be allowed considerable time to set prior to reaching the oven 28 where additional time will be required for them to move through the oven to completely cure prior to reaching the ejecting means 42 and 43.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with spaced work stations where a material is needed at different intervals of time, a supply station where the material may be placed in receptacles for the work stations and means actuable at each work station to indicate, at the supply station, the work station where the material is needed, of a continuous conveyor, means to support the conveyor for movement in a path adjacent the supply station and the work stations, like successive groups of cup-like holders, one holder for each station in each group, to receive and support the receptacles, and means fixedly mounting the holders at spaced positions on the conveyor throughout the conveyor, the respectively successive holders in each group being visually different in appearance to be readily distinguishable from each other to receive receptacles for their respective work stations.

2. The combination with spaced work stations where a material is needed at different intervals of time, a supply station where the material may be placed in receptacles for the work stations and means actuable at each work station to indicate, at the supply station, the work station where the material is needed, of a continuous conveyor, means to support the conveyor for movement in a path adjacent the supply station and the work stations, like successive groups of cup-like holders, one holder for each station in each group, to receive and support the receptacles, means fixedly mounting the holders at spaced positions on the conveyor throughout the conveyor, the respectively successive holders in each group being visually different in appearance to be readily distinguishable from each other to receive receptacles for their respective work stations, an energizable indicating unit disposed at each work station, and a switch for each work station adapted to be actuated by only the cup-like holders for its station when occupied by a receptacle of material to energize its respective indicating unit.

3. The combination with spaced work stations where a material is needed at different intervals of time, a supply station where the material may be placed in receptacles for the work stations and means actuable at each work station to indicate, at the supply station, the work station where the material is needed, of a continuous conveyor, means to support the conveyor for movement in a path adjacent the supply station and the work stations, like successive groups of cup-like holders, one holder for each station in each group, to receive and support the receptacles, means fixedly mounting the holders at spaced positions on the conveyor throughout the conveyor, the respectively successive holders in each group being visually different in appearance to be readily distinguishable from each other to receive receptacles for their respective work stations, an energizable indicating unit for each work station, a switch actuable to energize each unit mounted adjacent the path of the conveyor in advance of their respective work stations and at different levels, and elements carried by the cup-like holders and disposed at the different levels to register with their respective switches whereby a holder occupied by a receptacle will actuate only its respective switch.

4. The combination with spaced work stations where a material is needed at different intervals of time, a supply station where the material may be placed in receptacles for the work stations and means actuable at each work station to indicate, at the supply station, the work station where the material is needed, of a continuous conveyor, means to support the conveyor for movement in a path adjacent the supply station and the work stations, like successive groups of cup-like holders, one holder for each station in each group, to receive and support the receptacles, means fixedly mounting the holders at spaced positions on the conveyor throughout the conveyor, the respectively successive holders in each group being visually different in appearance to be readily distinguishable from each other to receive receptacles for their respective work stations, an energizable indicating unit for each work station, a switch actuable to energize each unit mounted adjacent the path of the conveyor in advance of their respective work stations and at different levels, cam-like elements for like holders in each group movably supported by their holders at different levels corresponding to the levels of their respective switches, the cams being ineffective alone to actuate their respective switches, and a member for each cam adapted to engage a receptacle when placed in its respective holder to hold the cam against movement to cause it to actuate its respective switch.

References Cited in the file of this patent

UNITED STATES PATENTS

| | | |
|---|---|---|
| 518,622 | Nye | Apr. 24, 1894 |
| 958,252 | Jenkins | May 17, 1910 |
| 1,143,829 | Jennings | June 22, 1915 |
| 1,270,969 | Parker | July 2, 1918 |
| 1,330,054 | Bridge | Feb. 10, 1920 |
| 1,724,236 | Tierney | Aug. 13, 1929 |
| 1,993,406 | Herold et al. | Mar. 5, 1936 |
| 2,112,513 | Abbott et al. | Mar. 29, 1938 |
| 2,208,536 | Brown | July 16, 1940 |
| 2,347,117 | Luxenbuger et al. | Apr. 18, 1944 |
| 2,362,079 | McCann et al. | Nov. 7, 1944 |
| 2,477,273 | Tognola | July 26, 1949 |
| 2,511,436 | Kauth | June 13, 1950 |
| 2,575,847 | Skillman | Nov. 20, 1951 |
| 2,582,449 | Millar et al. | Jan. 15, 1952 |